Patented Jan. 16, 1945

2,367,469

UNITED STATES PATENT OFFICE 2,367,469

POLYAMIDES

Paul Möller, Dessau, and Hans-Joachim Nicolai, Dessau-Haideburg, Germany; vested in the Alien Property Custodian No Drawing. Application March 13, 1941, Serial No. 383,226. In Germany March 14, 1940

1 Claim. (Cl. 260—78)

Our present invention relates to polyamides, and in particular to a new method for preparing hydrophilic superpolyamides.

The new hydrophilic polyamides described herein can be produced by condensing ω-mono-aminomonocarboxylic acids having at least four carbon atoms between the amide-forming groups, namely, between the amino group and the carboxyl group or the derivatives thereof as, for instance, lactams, esters, or amides in the presence of an inorganic acid. According to the acid content one obtains polymeric substances which are water-swellable or yield a colloidal aqueous solution or are transformed from the sol-state of the warm aqueous solution into the gel-state on cooling.

Under similar conditions the polyamide-forming compositions in which the reactants are diamines and dicarboxylic acids having long chains, likewise yield hydrophilic, water-soluble condensation products in the presence of inorganic acids. It will be understood that mention herein of these polyamide-forming reactants, as in the case of the amino acids referred to above, is intended to include their equivalent amide-forming derivatives.

While polymers stable on boiling and insoluble in water and in usual solvents are obtained by the condensation of the diamines and dicarboxylic acids having long carbon chains, a content of more than 0.1 mol of inorganic acid anion in the polymer effects that the condensation products are capable of strongly swelling in water, alcohols or other hydrophilic solvents or dissolving therein.

As reactants with a long carbon chain we mention mixtures of diamines or derivatives thereof having at least five carbon atoms between the amino groups and dicarboxylic acids or derivatives thereof (if desired substituted by aliphatic or cyclic radicals) having at least four carbon atoms between the carboxyl groups.

As inorganic acids the halogen hydracids are preferably employed. The process of the invention may also be accomplished with other strong monobasic mineral acids as, for instance, nitric acid or with polybasic inorganic acids.

The condensation or polymerization is conveniently carried out by heating at 200–250° C. in the absence of air. It is not necessary to use a special catalyst since the mineral acid already effects a sufficient acceleration of the condensation procedure. The acid is preferably added in the form of the salt of the diamine to be condensed or a derivative thereof.

It is also possible to prepare interpolyamides in which case the choice of the reactants depends on the intended use and may be made regardless of the desired sensitivity to water since this factor is solely controlled by the mineral acid used.

The new polyamides are used in various forms and for many purposes as, for instance, for gelatin substitutes binding agents, sizing and finishing agents, and thickening agents for printing pastes.

The more detailed practice of the invention is illustrated by the following examples. There are, of course, many forms of the invention other than these specific embodiments:

Example I 80 g. of hexamethylenediamine adipate and 20 cc. of concentrated hydrochloric acid (37.8%) are intimately mixed and heated together in an atmosphere of carbon dioxide at 211–222° C. during 20 hours after the air is carefully removed by carbon dioxide. The product thus obtained is yellowish brown and soluble in water and methanol.

If the amount of hydrochloric acid is decreased, water-insoluble polymers are obtained.

Example II 75 g. of hexamethylenediamine adipate and 23 g. of ε-aminocaproic-acid-hydrochloride are intimately mixed and condensed in the same way as described in Example I. The thus resulting product is yellowish brown and soluble in water and hot alcohols.

If the amount of ε-aminocaproic-acid-hydrochloride is decreased, products are formed which have a small solubility in water.

Example III 60 g. of hexamethylenediamine adipate, 40 g. of ε-caprolactam and 50 g. of ε-aminocaproic-acid-hydrochloride are polymerized in the manner as described in Example I. The polymer thus prepared is a tenacious transparent yellow product soluble in water and aqueous alcohols.

If the amount of ε-aminocaproic-acid-hydrochloride is lowered to 6.5 g., a milky water-insoluble polymer is produced.

Example IV

A mixture of 60.6 g. of sebacic acid, 25.9 g. of hexamethylenediamine and 23.4 g. of hexamethylenediamine hydrobromide is melted and heated at 225° C. for 15 hours in absence of air. The polymerization product is a slightly yellow and very tenacious mass soluble in water and warm methanol and can be worked up into transparent films.

We claim:

The process of preparing water-soluble polyamides which comprises condensing approximately 75 parts by weight of hexamethylenediamine adipate with about 23 parts of ε-aminocaproic-acid-hydrochloride at from 211–222° C. for twenty hours with exclusion of air.

PAUL MÖLLER.
HANS-JOACHIM NICOLAI.